United States Patent [19]

van Iperen et al.

[11] Patent Number: 4,772,669

[45] Date of Patent: Sep. 20, 1988

[54] CATIONIC COATING COMPOSITIONS

[75] Inventors: Roeland van Iperen; Petrus G. Kooymans; Johannes M. van der Mark, all of Amsterdam, Netherlands

[73] Assignee: Shell Oil Company, Houston, Tex.

[21] Appl. No.: 64,475

[22] Filed: Jun. 22, 1987

[30] Foreign Application Priority Data

Jul. 2, 1986 [GB] United Kingdom ............... 8616162

[51] Int. Cl.$^4$ .................. C08G 8/32; C08L 61/10; C08L 61/32; C08L 63/04
[52] U.S. Cl. .................... 525/484; 525/481; 525/488; 525/510; 525/514
[58] Field of Search ............ 525/510, 514, 481, 488, 525/484

[56] References Cited

U.S. PATENT DOCUMENTS

| | | | |
|---|---|---|---|
| 2,844,553 | 7/1958 | Taylor et al. | 260/19 |
| 3,630,977 | 12/1971 | Broecker et al. | 525/514 |
| 4,119,599 | 10/1978 | Woo et al. | 525/510 |
| 4,137,220 | 1/1979 | Lazzerini et al. | 528/135 |
| 4,368,298 | 2/1981 | Okayama et al. | 525/480 |
| 4,593,078 | 6/1986 | Kooymans et al. | 525/497 |
| 4,614,775 | 9/1986 | Bekooij et al. | 525/533 |
| 4,686,248 | 8/1987 | Bekooij et al. | 525/488 |

FOREIGN PATENT DOCUMENTS

| | | |
|---|---|---|
| 127915 | 12/1984 | European Pat. Off. |
| 62-100520 | 5/1987 | Japan ................... 525/481 |
| 1221906 | 2/1971 | United Kingdom . |
| 2001991 | 2/1979 | United Kingdom . |

Primary Examiner—John C. Bleutge
Assistant Examiner—Robert E. Sellers, II

[57] ABSTRACT

Disclosed is a process for the preparation of water-thinnable, hydrolytically stable, thermosettable, cationic coating compositions, with process comprises blending:

(1) 5–35 weight percent of a carboxylated crosslinking compound, and
(2) 65–95 weight percent of an amino group-containing resin binder, which binder comprises the reaction product of ammonia and a blend of
 (a) a polyglycidyl ether having n epoxy groups per molecule, wherein $1 < n < 1.9$, said polyglycidyl ether being the reaction product of a multifunctional polyglycidyl ether having x epoxy groups per molecule, wherein $x > 2$, and $(x-n)$ mol of a monofunctional phenol per mole of the multifunctional polyglycidyl ether, and
 (b) a diglycidyl ether having an epoxy group concentration in the range of from 1000 to 5500 mmol/kg, the average molar epoxy functionality of the glycidyl ethers, present in the blend of polyglycidyl ether and digylcidyl ethers, being $< 1.75$.

and wherein (1) and (2) are blended before or after neutralization of (2).

The thus prepared coating compositions are useful for coating the interior of food and beverage cans and produce coatings which combine very good taste performance properties with a high level of mechanical and chemical resistance properties.

15 Claims, No Drawings

CATIONIC COATING COMPOSITIONS

BACKGROUND OF THE INVENTION

This invention relates to a process for the preparation of hydrolytically stable cationic coating compositions, to the coating compositions prepared by said process and to the use thereof, particularly as aqueous thermosetting coating compositions for application via electrodeposition.

European Patent Application EP No. 0127915 discloses aqueous thermosetting coating compositions based on polyaddition products of defunctionalized multifunctional polyglycidyl ethers, diglycidyl ethers and selected amino group-containing compounds. Such defunctionalized polyglycidyl ethers are those having on average n epoxy groups per molecule, wherein $1<n<2$. They comprise the reaction products of multifunctional polyglycidyl ethers having on average x epoxy groups per molecule, wherein $x>2$, and (x-n) mol of a monofunctional phenol per mol of multifunctional polyglycidyl ether. The coating compositions, based on combinations of these polyaddition products with co-curing resins, when applied by electrodeposition and after stoving, yield coatings which have very good flow and flexibility properties as well as a good resistance to sterilization. This combination of performance properties makes them very suitable for use as the internal lining of cans for many different applications. However, when used as the internal coating of cans for applications where taste performance requirements are very critical, such as in certain beverage cans, some of these coatings failed to pass the most severe taste performance tests. Thus the taste performance properties of such coatings leaves room for further improvement. It is therefore an object of the present invention to improve the taste performance properties of these cationic coating compositions, while maintaining the high level of the other performance properties.

BRIEF SUMMARY OF THE INVENTION

According to the invention, a process is provided for the preparation of a water-thinnable, hydrolytically stable, thermosetting, cationic coating composition, which process comprises blending:

(1) 5-35 weight percent carboxylated crosslinking compound, and
(2) 65-95 weight percent of an amino group-containing resin binder, which binder comprises the reaction product of ammonia and a blend of
  (a) a polyglycidyl ether having n epoxy groups per molecule, wherein $1<n<1.9$, said polyglycidyl ether being the reaction product of a multifunctional polyglycidyl either having x epoxy groups per molecule, wherein $x>2$, and (x-n) mol of a monofunctional phenol per mol of the multifunctional polyglycidyl ether, and
  (b) a diglycidyl ether, having an epoxy group concentration (EGC) in the range of from 1000 to 5500 mmol/kb,
the average molar epoxy functionality of the glycidyl ethers present in the blend of polyglycidyl ether and diglycidyl ether being $<1.75$.

DETAILED DESCRIPTION OF THE INVENTION

The multifunctional polyglycidyl ether, from which the polyglycidyl ether having n epoxy groups per molecule is derived, may conveniently be a polyglycidyl ether prepared by reaction of a polyhydric phenol having a phenolic hydroxyl functionality greater than 2, with an epihalohydrin, preferably epichlorohydrin, in the presence of a hydrogen halide acceptor, e.g., an alkali metal hydroxide.

Examples of suitable such polyhydric phenols are novolac resins of general formula

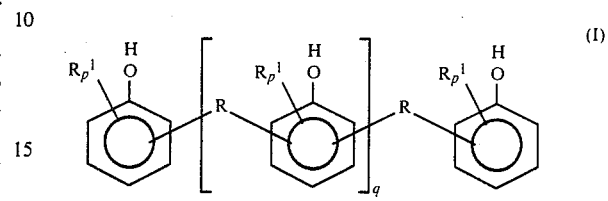

wherein R represents an alkylene, e.g., $CH_2$ group, $R^1$ represents an alkyl group, e.g., a methyl, p-t-butyl octyl or nonyl group, q and p are numbers having average values $0<q<6$ and $0<p<2$, or of general formula

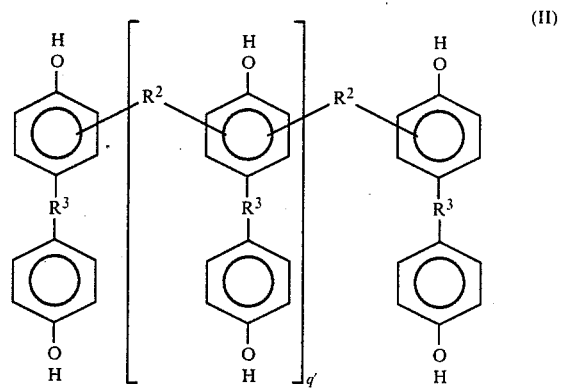

wherein $R^2$ represents an alkylene, e.g., $CH_2$ group, $R^3$ represents an alkylene, e.g., $CH_2$ or $C(CH_3)_2$ group, a carbonyl group, an oxygen or sulphur atom and q' is a number having an average value in the range of from 0 to 2.

Other examples of suitable polyhydric polynuclear phenols are 1,1-2,2-tetra(4-hydroxyphenyl)ethane and the tetraphenol derived from diphenolic acid having the general formula

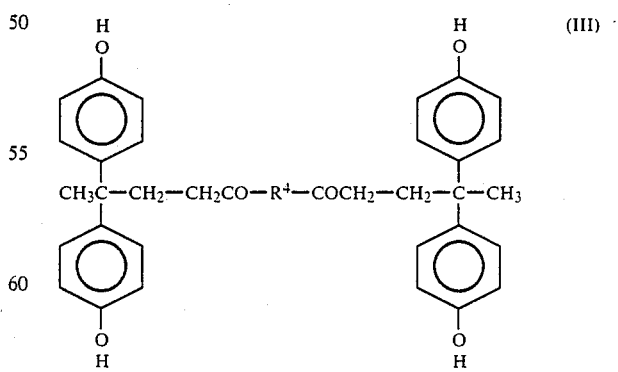

wherein $R^4$ represents the residue of a diol. Polyglycidyl ethers derived from polyhydric phenols of formulae I, II and III are known and are described, together with processes for their preparation, in, for example, U.S.

Pat. No. 2,844,553, Dutch Pat. application No. 8100830, W. German Pat. application No. 2,656,867 and British Pat. application No. 2 001 991.

Preferably the multifunctional polyglycidyl ether is an epoxy novolac resin wherein x is in the range from 2.5 to 3.5.

The monofunctional phenol may be a single phenol or a mixture of phenols. For example the phenol may conveniently be phenol optionally substituted by one or more of one or more substituents selected from $C_{1-16}$ alkyl, $C_{3-16}$ alkenyl, $C_{1-4}$ hydroxyalkyl, $C_{2-13}$ alkoxycarbonyl and $C_{1-16}$ alkoxy groups. Examples of such compounds include phenol, the cresols, salicyl alcohol, 2-allyl phenol, 2,4,6-triallyl phenol, dimethyl phenol, 4-hydroxymethyl-2,6-dimethyl phenol, 2-hydroxyphenethyl alcohol, 4-hydroxybenzyl alcohol and ethyl 4-hydroxybenzoate. Preferably the monofunctional phenol is phenol substituted in the para-position by a $C_{4-12}$ alkyl substituent. Examples of such alkyl substituents include n-, iso- and t-butyl, n- and iso-octyl, n-and iso-nonyl and n-and iso-dodecyl groups. Branched alkyl substituents are particularly suitable. P-iso-octyl phenol has been found to be a very suitable monofunctional phenol.

The diglycidyl ether will generally be a diglycidyl ether of a dihydric phenol such as 2,2-bis(4-hydroxyphenyl)-propane. Examples of diglycidyl ethers based on such a dihydric phenol are "EPIKOTE ® 1001" (EGC 2000 to 2220) and "EPIKOTE ® 3003" (EGC 1210 to 1380). Preferred diglycidyl ethers have a EGC in the range of from about 1800 to about 2400.

The reaction between ammonia and epoxy groups is known and is hereinafter referred to as "amidation." From British Pat. specification No. 1221906 it can be concluded that, with the amidation of diglycidyl ethers, the content of secondary and tertiary amino groups present in the reaction product is related to the excess of ammonia over epoxy used. A smaller excess will increase the content of secondary and tertiary amino groups as well as the molecular weight of the reaction product and the risk of gelation.

It can be expected that the presence of such higher molecular weight polyaddition products will contribute positively towards the performance of the ultimate coating. Although it might be possible to prepare such higher molecular weight reaction products by carefully controlled process conditions, in the process of the present invention it has been found advantageous to reduce the omnipresent risk of gelation by restricting the average number of epoxy groups per molecules of glycidyl ether. For the polyglycidyl ether the average molar epoxy functionality is restricted to $1 < n < 1.9$ preferably $1.3 < n \leq 1.6$, while the average molar epoxy functionality for the glycidyl ethers present in the blend of polyglycidyl ethers and diglycidyl ether is set at $< 1.75$.

It is preferred that the polyglycidyl ether and diglycidyl ethers are present in said blend in a weight ratio in the range of from 75:25 to 45:55.

In the preparation of the hereinbefore mentioned amino group-containing binders, it is preferred that on average 0.45 to 0.6 epoxy, for which at least 4.5 equivalents of amino-hydrogen per equivalent of epoxy is generally employed.

In the preparation of the amino group-containing binders, the blend of the polyglycidyl ether and diglycidyl ether may conveniently be contacted with ammonia while dissolved in an organic solvent. Preferably said solvent is a water-miscible solvent and includes mono $C_{1-16}$ alkyl ethers of mono- or polyethylene glycol or mono- or polypropylene glycol, and cyclic ethers such as tetrahydrofuran (THF) or dioxane. A preferred water-miscible solvent is 2-n-butoxyethanol.

The glycidyl ether content of these solutions may conveniently be in the range of from 50 to 90 weight percent and preferably in the range of from 60 to 70 weight percent. Ammonia may be introduced into the reactor as supplied, e.g., as a 25 weight percent aqueous solution. The resulting mixture will generally be inhomogenous and may as such be used for preparing the amino group-containing binder. It has however proven to be advantageous to carry out the amidation in the presence of one or more solvents, which when present in a sufficient concentration will convert the reactor contents into a more or less homogeneous mixture. Suitable such solvents include lower alcohols such as methanol and ethanol as well as lower ethers, especially cyclic ethers such as THF and dioxane. Very promising results have been obtained with a 4:1 w/w blend of THF and ethanol.

The amidation is carried out at a temperature in the range of from 20° to 120° C. and at atmospheric or slightly above atmospheric pressure. It is believed that the amino group-containing resin binders as prepared by the method as hereinbefore described are novel compounds.

The carboxylated crosslinking compound may be a carboxylated melamine-, urea- or phenolformaldehyde resin and is preferably a carboxylated melamine formaldehyde type resin. Cymel ® 1141 is such a carboxylated melamine formaldehyde resin. The carboxylated crosslinking compound is preferably present in a ratio of amino group-containing resin binder to carboxylated crosslinking compound of 85:15 to 75:25 (w/w). The carboxylated crosslinking compound can be blended with the amino group-containing resin binder before or after neutralization of the binder.

Pigments, fillers, dispersing agents, and other components known in the art of paint formulation may further be added. Addition of small amounts (up to 1 weight percent) of non-ionic surfactant may be useful for further stabilization of aqueous compositions or improvement of the wetting during application. Co-solvents, such as 2-n-butoxyethanol and, especially, 2-n-hexyloxyethanol, may advantageously be included. The water for use in the aqueous compositions is preferably purified, such as by distillation or demineralization. The water-dilutable compositions may be applied by a variety of methods known in the art, onto a variety of substrates, in particular metals such as bare steel, phosphate steel, chromate-treated steel, zinc, tim plate (for can coating), and aluminum (also, e.g., for can coating), to produce cured coatings of desirable thickness, from 2 micrometers upwards up to in general 40 micrometers.

Curing of the coating compositions made according to the process of the present invention can be performed by stoving, for example, at temperatures of from 170° to 220° C., with curing times varying from 3 to 20 minutes.

The thermosetting coating compositions may generally be applied by electrodeposition and other methods such as spraying or dipping, and are particularly suitable for coating cans by electrodeposition.

The invention will be further understood from the following examples, in which parts and percentages are by weight, unless otherwise indicated, and various terms are defined as follows:

Polyether I is a multifunctional epoxy diphenylolpropane novolac resin, having an average molecular weight 615 and on average 3.1 epoxy groups per molecule.

Polyether II is a multifunctional epoxy diphenylolpropane novolac resin, having an average molecular weight 660 and on average 3.3 epoxy groups per molecule.

Polyether III is a multifunctional epoxy novolac resin, having an average molecular weight 665 and on average 3.5 epoxy groups per molecule.

Polyether IV is a multifunctional epoxy novolac resin, having an average molecular weight 732 and on average 3.5 epoxy groups per molecule.

Polyether E-1 is a solid diglycidyl ether of 2,2-bis(4-hydroxyphenyl)propane having an EGC of 2128 mmol/kg.

Polyether E-2 is a solid diglycidyl ether of 2,2-bis(4-hydroxyphenyl)propane having an EGC of 2040 mmol/kg.

Polyether E-3 is a solid diglycidyl ether of 2,2-bis(4-hydroxyphenyl)propane having an EGC of 2062 mmol/kg.

CYMEL ® 1141 is a highly alkylated melamine-formaldehyde curing resin containing methoxy and isobutoxy substituents and acidic chelating groups, 85 weight percent solids in isobutanol, and having an acid value of 22±3 mg KOH/g. "Amine value" is expressed in milliequivalents (amino) nitrogen per gram.

"ECG": epoxy group concentration expressed as mmol per Kg.

"Ep $f_{av}$": average epoxy functionality.

Polyglycidyl Ether Preparation

Four different polyglycidyl ethers were prepared by heating a multifunctional polyether and a monofunctional phenol with stirring to 140° C., whereupon tetramethylammonium chloride (TMAC) was added as a 50% solution in water. The reactor contents were maintained at 140° C. until the reaction had been completed, i.e., the calculated EGC had been obtained. After a slight cooling 2-n-butoxyethanol was added to arrive at a solution containing 66.7 weight percent solids. Process details and product characteristics are given in Table 1.

TABLE 1

| Polyglycidyl ether | Polyether type | g | Monofunctional phenol type | g | TMAC g | Product data | | visc. at 25° C. Pa.s |
|---|---|---|---|---|---|---|---|---|
| | | | | | | ECG mmol/kg | Ep. fav | |
| 1 | I | 615 | nonyl- | 352 | 0.48 | 1500 | 1.5 | 1.4 |
| 2 | II | 660 | octyl- | 391.4 | 0.53 | 1330 | 1.4 | — |
| 3 | III | 665 | " | 432.6 | 0.55 | 1275 | 1.4 | 2.4 |
| 4 | IV | 680 | " | 412 | 0.55 | 1370 | 1.5 | — |

EXAMPLES I–V

Preparation of Amino Group-Containing Resin Binders

The binders were prepared according the following procedure: An amount of a Polyether solution, 66.7 weight percent in 2-n-butoxyethanol, corresponding with 1.5 eq epoxy, an amount of diglycidyl ether E-1 or E-2 corresponding with 1.5 eq epoxy and additional 2-n-butoxyethanol were homogenized by heating to 90° C. with stirring. After cooling to 25° C. a 25 weight percent aqueous solution of ammonia was added in an amount as indicated hereinafter together with a sufficient amount of a 4/1 w/w blend of THF/ethanol to arrive at a clear "solution." Thereupon the temperature of the reactor contents was gradually raised to about 60° C. in approximately 6 hours during which period virtually all the epoxy groups had reacted. Subsequently the temperature in the reactor was increased to 120° C., in as short a time as was possible, and maintained at that temperature to remove excess ammonia, water, THF and ethanol by distillation using a nitrogen purge. The ammonia removal was checked with the aid of a wet paper-pH-indicator.

Process details and product characteristics are given in Table 2.

TABLE 2

| Example | I | II | III | IV | V |
|---|---|---|---|---|---|
| Polyglycidylether type | I | I | I | II | III |
| Polyglycidyl solution g | 1450.5 | 1450.5 | 1450.5 | 1690 | 1764.6 |
| Diglycidyl ether type | E-1 | E-1 | E-1 | E-2 | E-2 |
| Diglycidyl ether g | 708 | 708 | 708 | 735 | 735 |
| 2-n-butoxyethanol g | 634.5 | 634.5 | 634.5 | 246 | 686 |
| Ammonia (25% w sol) g | 408 | 816 | 1632 | 408 | 408 |
| THF/ethanol 4/1 w/w g | 772.5 | 1875 | 4350 | 1552 | 600 |
| Product data | | | | | |
| Solids content % | 60.9 | 60.4 | 61.4 | 70 | 60 |
| Total nitrogen on solids meq/g | 0.95 | 1.08 | 1.25 | 0.91 | 0.91 |
| Tertiary amine meq/g | 0.14 | 0.1 | 0.05 | 0.13 | 0.135 |
| Secondary amine meq/g | 0.45 | 0.49 | 0.414 | 0.43 | 0.38 |
| Primary amine meq/g | 0.36 | 0.49 | 0.786 | 0.35 | 0.395 |
| Viscosity (25° C.)Pa.s (40% w in 2-n-butoxyethanol) | 1.0 | 0.61 | 0.59 | 1.25 | 1.5 |

COMPARATIVE EXAMPLE A

Preparation of 2-Amino-2-Methyl-1-Propanol Based Amino-Group Containing Binder

A 95% aqueous solution of 2-amino-2-methyl-1-propanol (154.6 g, 1165 mol), water (40 g) and 2-n-butoxyethanol (100 g) were heated with stirring to 100° C. To the resulting mixture was added a homogenous mixture of Polyglycidyl ether 4 (1638 g; 66.7% solids; 1.5 epoxy equivalents) polyether E-3 (727.5 g, 1.5 epoxy equivalents) and 2-n-butoxyethanol (197 g), over a period of 2 hours, with stirring, while the temperature was maintained at 100° to 110° C. After the addition was complete, the mixture was kept at 100° to 120° C. with stirring for a further 8 hours, until reaction was complete (amine value 0.84 on solids). The resulting product had a solids content of 68.8 weight percent while the viscosity at 25° C. of the 40 weight percent solution in 2-n-butoxyethanol was 1.8 Pa.s.

EXAMPLES VI-VIII

Preparation of Aqueous Lacquers for Electrodeposition

The 2-n-butoxyethanol solutions of the amino group-containing resin binders as prepared in Examples I, IV and V were blended respectively with the appropriate amounts of Cymel 1141 and 2-n-hexyloxyethanol, neutralized with lactic acid and finally diluted with demineralized water to arrive at lacquers having a solids content of 15 weight percent. The quantities of each of the components used are given in Table 3 together with the characteristics of the lacquers thus prepared.

TABLE 3

| Example | VI | VII | VIII |
|---|---|---|---|
| Binder solutions from Ex. | I | IV | V |
| Binder solution g | 1000 | 857 | 1000 |
| Cymel 1141 | 208 | 176.5 | 176.5 |
| 2-n-hexyloxyethanol g | 61 | 178 | 60 |
| Lactic acid (90% w) g | 39 | 41 | 41 |
| Demineralized water g | 3929 | 3747.5 | 3722.5 |
| Lacquer Characteristics | | | |
| Binder/cocuring resin ratio | 77.5/22.5 | 80/20 | 80/20 |
| Degree of neutralization | 0.67 | 0.75 | 0.75 |
| pH | 5.5 | 5.0 | 4.9 |
| Conductivity ms | 700 | 634 | — |

COMPARATIVE EXAMPLE B

Preparation of Aqueous Lacquer For Electrodeposition

The adduct of comparative Example A (321.6 g) "CYMEL 1141" (60 g) and 2-n-hexyloxyethanol (61.2 g) were mixed together at ambient temperature (20° C.). The resulting homogeneous mixture was neutralized with 90 weight percent lactic acid in water (12.5 g, $\alpha$=0.7) and thinned with demineralized water (2267.4 g). The resulting coating composition had a solids content of 10 weight percent, pH 4.2 and conductivity 650 $\mu$s/cm at 20° C.

EXAMPLES IX-XI

Cathodic Electrodeposition

The lacquers as prepared in examples VI-VIII are used to coat 330 ml tim-plate cans (2-piece DWI cans) by cathodic electrodeposition. The can formed the cathode of an electrodeposition cell, the anode being a stainless steel member inserted within the can at a substantially uniform separation of 2 millimeters from the can. A potential differece of 110-120 V, which resulted after baking in a coating weight per can in the range of 200-250 mg, corresponding with an average dry film thickness in the range of 5 to 6 $\mu$m, was applied between the can and the anode for 1-2 seconds. After removal from the electrodeposition cell, the coated can was vigorously rinsed with demineralized water and the coating was cured by stoving for 5 minutes at 200° C.

After curing and measuring the weight of the coating, the porosity was tested by using a WACO ENAMEL RATER (ex Wilkens-Anderson, USA). The principle of this method is that when a potential difference (6.2 V) is applied between the can filled with an electrolytic solution and an electrode inserted in said electrolytic solution, a current will pass between the electrode and the inner surface of the can only if the coating has insufficient insulating power, i.e., when the file contains pores. Hence the current measured is a yard stick for the film quality. A current <0.6 mA is considered to correpond with a non porous film.

Results are given in Table 4 following, in which solvent resistance is expressed in terms of "MEK rubs", i.e., the number of double rubs with a methylethylketone-moistened cloth necessary to remove the coatings, while the file appearance (flow) is expressed as a numerical rating resulting from a visual assessment (5: smooth surface, excellent flow, no defects, 4: orange-peel surface, 3: orange-peel type surface and few bubbles and-/or pinholes, 2: many bubbles and/or pinholes).

The sterilization resistance of the coating was determined by exposure to water at 121°C. for 90 minutes and rated according to a numerical scale ranging from 5: no blushing to 0 very heavy blushing.

The coatings were tested for taste by a taste panel employing mineral water as the taste sensible beverage.

COMPARATIVE EXAMPLE C

Cathodic Electrodeposition of Aqueous Lacquer Composition from Comparative Example B The aqueous lacquer composition from Comparative Example B was applied by electrodeposition onto a 330 ml tin-plate can by the same method as for the lacquer compositions from examples VI-VIII. The results have been incorporated in Table 4.

The results in Table 4 indicate that the cationic coating compositions, made according to the process of the present invention, are superior in taste performance compared with the ammonia-free based system while simultaneously maintaining the high level of other performance properties.

TABLE 4

| Example | IX | X | XI | Comp. C |
|---|---|---|---|---|
| Lacquer composition from example | VI | VII | VIII | Comp. B |
| Deposition voltage V | 120 | 100 | 110 | 110 |
| Deposition time s | 2 | 1.5 | 2 | 1.5 |
| Film appearance | 5 | 5 | 5 | 5 |
| Enamel rater reading (porosity) mA | | mostly <0.6 | | |
| MEK resistance (double rubs) | >50 | >50 | >50 | >50 |
| Wedge bend flexibility % | 40-45 | 40 | 30-40 | 25-35 |
| Sterilization resistance | in water 5, | in 0.5% lactic acid | 3-4 | |
| Taste rating* | very good | very good | very good | moderate |

*very good: passes test for very critical beverages
moderate: passes test for less taste sensitive beers and beverages

What is claimed is:

1. A process for preparing a coating composition, which process comprises blending:
   (1) 5-35 weight percent of a carboxylated crosslinking compound, and
   (2) 65-95 weight percent of an amino group-containing resin binder, which binder comprise the reaction product of ammonia and a blend of
      (a) a polyglycidyl ether having n epoxy groups per molecule, wherein $1<n<1.9$, said polyglycidyl ether being the reaction product of a multifunctional polyglycidyl ether having x epoxy groups per molecule, wherein $x>2$, and (x-n) mol of a monofunctional phenol per mol of the multifunctional polyglycidyl ether, and
      (b) a diglycidyl ether having a EGC in the range of from about 1000 to about 5500 mmol/kg, the average molar epoxy functionality of the glycidyl ethers present in the blend of polyglycidyl ether and diglycidyl ether being $<1.75$.

2. A process according to claim 1, wherein the multifunctional polyglycidyl ether is an epoxy novolac resin wherein $2.5 \leq x \leq 3.5$.

3. A process according to claim 1, wherein the monofunctional phenol is a phenol substituted in the para position by a $C_{4-12}$ alkyl substituent.

4. A process according to claim 1, wherein $1.3<n\leq 1.6$.

5. A process according to claim 1, wherein the diglycidyl ether is a diglycidyl ether of 2,2-bis(4-hydroxyphenyl)propane, having an EGC within the range of about 1800 to about 2400.

6. A process according to claim 1 wherein the polyglycidyl ether and the diglycidyl ether are present in the blend of (a) and (b) in a weight ratio in the range of from 75:25 to 45:55.

7. A process according to claim 1 wherein the amino group-containing binder is prepared by reacting ammonia with the blend of (a) and (b) at a temperature in the range of from 20° to 120° C. and at atmospheric or slightly above atmospheric pressure.

8. A process according to claim 7, wherein the temperature is in the range of from 20° to 70° C.

9. A process according to claim 7 wherein an aqueous ammonia solution is employed.

10. A process according to claim 7 wherein at least 4.5 eq of amino-hydrogen per equivalent of epoxy is employed.

11. A process according to claim 7 wherein on average 0.45 to 0.6 mol of ammonia is reacted per equivalent of epoxy.

12. A process according to claim 7 wherein at least a water-miscible solvent is present.

13. An amino group-containing binder prepared by a process according to claim 7.

14. A process according to claim 12 wherein the crosslinking compound and the amino group-containing binder are present in a weight ratio in the range of from 15:85 to 25:75.

15. A coating composition prepared by a process according to claim 1.

* * * * *